United States Patent [19]

Erickson

[11] Patent Number: 4,459,068

[45] Date of Patent: Jul. 10, 1984

[54] METHOD OF INCREASING THE ABSORBENT CAPACITY OF PLANT SOILS

[75] Inventor: Robert E. Erickson, Midland, Mich.

[73] Assignee: The Dow Chemical Company, Midland, Mich.

[21] Appl. No.: 336,539

[22] Filed: Jan. 4, 1982

[51] Int. Cl.$^3$ .................... E02D 3/00; C09K 17/00
[52] U.S. Cl. .................................... 405/264; 106/900
[58] Field of Search ................ 106/900; 405/263, 264

[56] References Cited

U.S. PATENT DOCUMENTS

| | | | |
|---|---|---|---|
| 2,625,529 | 1/1953 | Hedrick et al. | 106/900 X |
| 2,651,619 | 9/1953 | De Mello et al. | 106/900 X |
| 2,652,379 | 9/1953 | Hedrick et al. | 106/900 X |
| 2,759,902 | 8/1956 | Magnussen et al. | 106/900 X |
| 2,988,441 | 6/1961 | Pruitt . | |
| 3,082,074 | 3/1963 | Handley . | |
| 3,555,828 | 1/1971 | Goldstein et al. | 405/264 |
| 3,705,467 | 12/1972 | McKnight | 47/9 |
| 3,798,836 | 3/1974 | Rubens et al. . | |
| 4,117,184 | 9/1978 | Erickson et al. | 428/224 |
| 4,380,886 | 4/1983 | Koslow et al. | 405/264 |

FOREIGN PATENT DOCUMENTS

| | | | |
|---|---|---|---|
| 704790 | 3/1965 | Canada | 405/264 |
| 46-37841 | 8/1971 | Japan | 405/264 |

OTHER PUBLICATIONS

Alan S. Michaels et al., "Soil Floculants and Stabilizers", *Agricultural and Food Chemistry*, vol. 1, No. 13, Sep. 16, 1953, pp. 835–843.

*Primary Examiner*—George A. Suchfield
*Attorney, Agent, or Firm*—A. J. Borschke

[57] ABSTRACT

The invention discloses a method for increasing the water capacity and air capacity of soil matrixes comprising modification of such soil matrixes with a water-absorbing laminate by positioning in the soil a mass of said laminate having a lightly cross-linked polyelectrolyte film with a layer of wicking substrates adhered to both sides of the absorbent film.

15 Claims, No Drawings

METHOD OF INCREASING THE ABSORBENT CAPACITY OF PLANT SOILS

BACKGROUND OF THE INVENTION

This invention relates to water-swellable, absorbent aerated films or laminates made from lightly cross-linked polyelectrolytes and their application in the field of soil modification to enhance the water capacity and air capacity of the soil matrix.

The patent application by W. D. Burkholder, Ser. No. 565,880, filed Apr. 7, 1975 (now abandoned), discloses methods of curing polyelectrolytes to make water-swellable films wherein the curing or cross-linking agent is a polyamido-polyamine epichlorohydrin adduct. The patent to J. R. Gross, U.S. Pat. No. 3,980,663 discloses absorbent articles, films, etc. and methods for their preparation wherein the cross-linking agents are reactive with carboxylate groups. The patent to Robert E. Erickson, U.S. Pat. No. 4,117,184, discloses that when films and laminates are mechanically aerated prior to the curing step, one can prepare a water-swellable, aerated film or laminate which exhibits enhanced fluid absorbency and flexibility.

It is well-known that absorbent polymers added to soil matrixes will increase the water-holding capacity of the soil. The prior-known methods added finely divided particulate absorbent powder to the soil matrix. Several problems became evident when the soil matrix was modified by particulate absorbent. The absorbent particles tend to shift position in the dry soil during mixing or working the soil. Also, only very low concentrations of absorbent polymer can be used without causing a sealing effect in the soil. Thus, water or air cannot percolate through the soil when this sealing effect occurs. The absorbent film/tissue laminate solves many of these problems since it can be placed into the soil where it is needed without sealing the soil and also due to its physical form does not shift in the soil.

SUMMARY OF THE INVENTION

The present invention is a method for increasing the water capacity and air capacity of soil matrixes by modification of such soil matrixes with an absorbent film/tissue laminate of a water absorbent or water-swellable polymer. The laminate is twisted, crumpled, chopped or shredded and positioned in the soil, thus providing air spaces in addition to those formed by the presence of the absorbent in the soil matrix and those of the soil matrix itself.

DETAILED DESCRIPTION OF THE INVENTION

The absorbent laminates of this invention are water-swellable, aerated films and laminates.

These films may be made from solutions of carboxylic polyelectrolytes which, prior to curing, are aerated and then cured and/or cross-linked with a polyfunctional, preferably difunctional, cross-linking agent that is reactive with carboxylate groups by heating and/or removing substantially all of the water and/or alcohol from the precursor composition.

The use of hydrophilic absorbent laminate in soil matrixes can effectively increase the survival times of plants during shipment and store display. This is largely due to a significant reduction in the number of times watering is required to sustain the plant. Reducing the number of times watering is required, while still maintaining a healthy plant, leads to more attractive and commercially marketable plants over a greater period of time.

The present invention utilizes a water-swellable, film which is characterized by being rapidly wetted and swelled by water and which comprises a lightly cross-linked carboxylic polyelectrolyte having a density ranging from about 0.3 to about 1.1 grams per cubic centimeter. Preferably, the film has a density of from 0.5 to about 0.9 gram per cubic centimeter. The absorbent laminate can easily be used with modern machinery and can be placed into a seeding furrow by tractor or placed by hand in potted plants. The composition of the absorbent can be varied to include micronutrients, fungicides, fertilizers, etc. The composition may also contain different amounts and types of surfactants and different types and amounts of cross-linking agents.

Various materials may be used for lamination to the surfaces of the hydrophilic absorbent film. The specific end-use requirements will determine which materials will be used and can vary from woven textiles to tissue paper. If desired, different shapes or forms of the laminate may be used to provide the end-use requirements.

The water-swellable films of this invention may be combined into laminates with wicking or nonwicking substrates. Examples of wicking substrates include woven fabrics, nonwoven fiber mats, polymeric foams, tissue paper, crepe paper and toweling. Examples of nonwicking substrates include polymer films such as polyethylene, polypropylene and polystyrene; and hard surface papers such as Kraft and writing paper.

The water capacity of the soil matrix is defined as that amount of water which the soil matrix is able to retain under flooding conditions, i.e., its level of saturation after which additional water percolates through the soil matrix. By "soil" is meant a medium capable of supporting some plant growth without added nutrients and is inclusive of mineral soils which have a predominance of inorganic constituents and soils which contain organic matter. Included in "soil" as herein employed are mixtures of natural soil with nongrowth supporting materials frequently added to soil to improve texture, porosity, etc. such as sand, charcoal, expanded silicate, decomposed leafy matter, sawdust, humus and the like. Typical of such mixture encompassed in the present invention is commercial potting soil, a representative potting soil being a mixture of mineral soil, peat, sand and humus.

By "plant nutrients" is meant the macronutrients essential to plant growth: calcium, nitrogen, phosphorus, sulfur, potassium and magnesium. The invention also embraces the addition of micronutrients: boron, manganese, iron, zinc, molybdenum and copper which are necessary for plant growth. The nutrients are preferably supplied in such amounts as necessary to sustain satisfactory plant growth.

The absorbent laminate is produced according to methods and procedures described in R. E. Erickson et al., U.S. Pat. No. 4,117,184. Polyelectrolytes useful in this invention must be essentially water-soluble in the salt form. Examples of useful polyelectrolytes include ammonium or alkali metal salts of homopolymers of acrylic or methacrylic acid and copolymers with one or more ethylenically unsaturated comonomers.

Preferably, the polyelectrolyte is a partially saponified polyacrylate polymer. The polymer before saponification is the result of reacting together a mixture of monomers which comprises (1) 30 to 92 percent by weight of an alkyl acrylate wherein the alkyl group has from 1 to 10 carbon atoms, an alkyl methacrylate wherein the alkyl group has from 4 to 10 carbon atoms, or mixtures thereof; (2) 8 to 70 percent by weight of an olefinically unsaturated carboxylic acid; and (3) 0 to 15 percent by weight of an omega hydroxyalkyl acrylate wherein the hydroxyalkyl group has from 1 to 4 carbon atoms.

Examples of useful alkyl acrylates include methyl acrylate, ethyl acrylate, propyl acrylate and hexyl acrylate. Examples of useful alkyl methacrylates include butyl methacrylate, hexy methacrylate, octyl methacrylate and decyl methacrylate. Examples of useful omega hydroxyalkyl acrylates include 2-hydroxyethyl acrylate, hydroxymethyl acrylate, 3-hydroxypropyl acrylate and 4-hydroxybutyl acrylate.

The olefinically unsaturated carboxylic acids useful in this invention are mono- or polycarboxylic acids. Examples of monocarboxylic acids include acrylic acid, methacrylic acid, crotonic acid and isocrotonic acid. Examples of polycarboxylic acids include maleic acid, fumaric acid and itaconic acid.

The foregoing polyacrylates are then dissolved in an aqueous alkali metal hydroxide solution. The amount of hydroxide solution employed is sufficient to saponify some of the acrylate esters to alkali metal carboxylates and to neutralize the carboxylic groups of the polyacrylate to alkali metal carboxylates so that the saponified polyacrylate polymer has from 30 to 70 weight percent alkali metal carboxylates.

The partially saponified polyacrylate polymer is employed as a solution containing from 5 to 60 percent by weight of the polymer.

A list of applicable polymers which could be prepared from readily available monomers and converted into salt form is as follows:
  acrylic acid-acrylate copolymers
  acrylic acid-acrylamide copolymers
  acrylic acid-olefinic copolymers polyacrylic acid
  acrylic acid-vinyl aromatic copolymers
  acrylic acid-styrene sulfonic acid copolymers
  acrylic acid-vinyl ether copolymers
  acrylic acid-vinyl acetate copolymers
  acrylic acid-vinyl alcohol copolymers
  copolymers of methacrylic acid with all the above comonomers.

If desired, the foregoing polymers, copolymers, etc., can also be sulfonated by treatment with sulfur trioxide, chlorosulfonic acid or fuming sulfuric acid in an inert, organic solvent.

Illustrative examples of the polyfunctional cross-linking agents useful in this invention are set forth in U.S. Pat. Nos. 2,926,154; 3,224,986 and 3,332,901. These polyfunctional cross-linking agents are generally known as polyamide-polyamine epichlorohydrin adducts. The disclosures of these references are incorporated herein by reference. Similar cross-linking agents are also commercially available from Hercules Incorporated as Kymene 557 and Polycup 172. The structure of these adducts has been discussed in an article by M. E. Corr et al., *Journal of Applied Polymer Science*, Vol. 17, pp. 721–735 (1973).

Illustrative examples of the difunctional agents useful in this invention are polyhaloalkanols such as 1,3-dichloroisopropanol; 1,3-dibromoisopropanol; sulfonium zwitterions such as the tetrahydrothiophene adduct of novolac resins; haloepoxyalkanes such as epichlorohydrin, epibromohydrin, 2-methyl epichlorohydrin and epiiodohydrin; polyglycidyl ethers such as 1,4-butanediol diglycidyl ether, glycerine 1,3-diglycidyl ether, ethylene glycol diglycidyl ether, propylene glycol diglycidyl ether, diethylene glycol diglycidyl ether, neopentyl glycol diglycidyl ether, polypropylene glycol diglycidyl ethers having an epoxy equivalent weight range from about 182 to about 975 and mixtures of the foregoing.

Also useful as cross-linking agents are monomeric amine-epihalohydrin adducts prepared by reacting at least two moles of an epihalohydrin with one mole of various monoamines, diamines and triamines at a temperature in the range of 0° to 90° C. for a time period of 0.5 to 8 hours. The reaction is carried out in a reaction media containing 20 to 90 percent water, lower alcohols such as methanol or ethanol, or in aqueous solutions of the lower alcohols. The amineepihalohydrin adducts are used directly as made, without separation or concentration. The preparation and use of amino-epihalohydrin adducts as cross-linking agents is further disclosed in the patent application by J. R. Gross, Ser. No. 796,627 filed May 13, 1977. This application is incorporated by reference herein.

Sulfonium zwitterions are known from U.S. Pat. Nos. 3,660,431; 3,749,737 and 3,749,738. The disclosures of these patents are incorporated herein by reference.

These cross-linking agents are used in an amount from about 0.5 to about 5.0 percent based on the weight of the polymer used. This is generally sufficient to cause the polymer to become lightly cross-linked.

For the purpose of this invention, a moisture or water-absorbent or water-swellable polymer is defined as one which absorbs in the range of 90–250 grams of deionized water per gram of polymer. The level of cross-linking agent used is a variable factor which is dependent upon the particular polymer used and the molecular weight of the polymer. In general, the amount used varies from the 0.5 to 5.0 percent based on the weight of the polymer. However, this range is varied for each polyelectrolyte in order to adjust the absorbency of the final cross-linked polymer.

The above composition of the polymers, which may be mechanically aerated, is spread onto a heated roller of metal, plastic or other impervious substrate and dried to cross-link the polymer and drive off the excess water and/or alcohol. The film is then stripped or peeled off the roller to recover the intact film for subsequent storage, lamination to substrates or other use.

One embodiment of the laminate is wherein the central film is crushed to be substantially discontinuous. Such a laminate can be made by a procedure in which the wet film is made between two substrates, the moisture content reduced to less than about 8 percent by weight and the laminate then passed through a crushing zone to break the film into pieces which remain adhered to the substrates.

Improved absorbency rate is also possible by perforating the laminate at relatively close intervals.

For the purposes of this invention, a film is defined as having a thickness of 0.1 to 10.0 mils and preferably from 1 to 3 mils.

It is sometimes desirable to add a small amount of a surfactant to the polyelectrolyte composition to aid in flowing on and removing the continuous film from the water impervious substrate. A secondary benefit of using a surfactant is to increase the wettability of the final dry absorbent film. Either anionic or nonionic surfactants may be used. Examples of the useful surfactants are the sodium alkyl sulfonates and the ethylene oxide derivatives of alkylated phenols and the like.

To achieve the benefits of the invention, the laminate is twisted, crumpled, chopped, shredded, etc., and placed into the soil. A substantial benefit is achieved when a twisted strip of the laminate is placed as a torus surrounding the root system of the plant and close to the root growth area. A convenient technique is to place one or more twisted strips about the sides of the planting hole and backfilling the hole with soil.

Although the size of the strip to be twisted may be varied to suit a given situation, a strip 3 to 5 inches wide that is long enough to ring the planting hole is preferred for fruit tree resets. For small potted plants, the amount would be considerably less. An optimum amount based on the efficiency of the laminate, the size of the plant and other known factors will be deducable from simple preliminary determinations.

It should also be noted that due to the nature of certain laminate polymer film compositions, excessive concentrations of salts in the soil will decrease the laminate's hydrophilic performance thereby decreasing the ability of the laminate to be an effective water sorbent within the soil matrix. In this regard, excessive calcium deposits in the soil matrix may decrease the absorbent capacity of the film/tissue laminate. Similarly, sea water decreases the efficiency of the sorbent laminate within the soil matrix, with the decrease being dependent upon the salt concentration of the sea water as it percolates through the laminate-containing soil matrix.

The following examples are presented to further illustrate but not limit the invention.

EXAMPLE 1

Six variations for position and weight of absorbent were selected including a control. Four duplicates of each variable were made giving a total of 24 samples. The variables are shown as follows:

A. No Absorbent (Control)
B. 2 grams laminate, center (1.5 g) and bottom (0.5 g)
C. 2 grams laminate, top (1 g) and bottom (1 g)
D. 2 grams laminate, center (2 g)
E. 3 grams laminate, center (2 g) and bottom (1 g)
F. 3 grams laminate, center (3 g)

The position of the absorbent laminate was located by marking the inside of the pot as follows:

a. Bottom  ½ inch from the bottom surface of the pot.
b. Center  2 inches from the bottom surface of the pot.
c. Top     2¾ inches from the bottom surface of the pot.

In B, ½ inch (1.27 cm) of soil was placed into the bottom of the pot. The three-inch (7.62 cm) wide laminate was twisted to about a one-inch (2.54 cm) diameter rope and 0.5 gram placed on the soil around the inside wall of the pot. Soil was added to a height of two inches (5.08 cm) and 1.5 grams of twisted laminate placed on top of the soil around the inside wall of the pot. The remainder of the 450 grams of soil was placed into the pot and gently packed. The pots were allowed to drain overnight (approximately 16 hours) and the total weight of the pot was recorded.

In C, the procedure as in B was followed except 1 gram of twisted laminate was placed ½ inch (1.27 cm) from the bottom and 1 gram placed 2¾ inches (6.98 cm) from the bottom.

In D, the procedure as in B above was followed except 2 grams of laminate were placed 2 inches (5.08 cm) from the bottom of the pot.

In E, the procedure as in B above was followed except 1 gram of twisted laminate was placed ½ inch (1.27 cm) from the bottom and 2 grams of laminate placed 2 inches (5.08 cm) from the bottom.

In F, the procedure as in B above was followed except 3 grams of twisted laminate were placed 2 inches (5.08 cm) from the bottom of the pot.

The plants were stored in an enclosed room wherein the temperature was held constant at about 73° F. (22.8° C.) and the relative humidity ranged from about 35 percent to 50 percent, with the only light being the fluorescent light during the day.

When wilting of any plants occurred, all plants were reweighed but additional water was added only to the wilted plants. The amount of water added to each of the samples after 19 days ranged from about 100 grams to about 450 grams. The total amount of water added after 21 days ranged from about 200 grams to about 450 grams.

The data in Table I clearly demonstrates the benefit of using the absorbent laminate to increase the time before plant wilting occurs and water is required. Some of the plants just received water at 21 days and, therefore, would not require water again for several days. Two samples showed significantly low water requirements, with no obvious explanation available. It should be noted that the amount of water lost from the pot is not reduced by using the laminate, at least in a clay pot. However, the amount of additional water required during this 21-day experiment was significantly reduced. This can probably be explained by the absorbent retaining more water for plant use during the test period.

The position of the absorbent in the pot definitely changes the wilting pattern of the plant. The use of 2 grams of absorbent laminate in the soil of transplanted plants increases the time to wilt by 50 to 104 percent depending upon the position of the absorbent in the pot. The control plants (A) required water about every four days after the initial plant wilting occurred. On the average, the use of absorbent about doubled the time before wilting was observed. A summary of the data is shown in Table I.

TABLE I

| Sample | Days to First Wilting | Days to Second Wilting | Days to Third Wilting | Days to Fourth Wilting | Total Grams Water Loss Avg. |
|---|---|---|---|---|---|
| A | 6 | 13 | 17 | 21 | 552 |
| B | 9.5 | 15 | 21 | — | 585 |
| C | 12.25 | 21 | — | — | 565 |
| D | 9 | 15 | 21 | — | 585 |
| E | 10.75 | 17 | — | — | 561 |
| F | 9.5 | 17 | — | — | 573 |

EXAMPLE 2

Thirty Thompson grapefruit resets were planted at a row spacing of 20 feet by 30 feet (72.6 trees per acre) in a test area of a citrus grove in Florida in February. The resets were grafted on Cleopatra Mandarin root stacks. Ten of the resets were planted with a low rate of absorbent laminate, ten with high rate and ten with no laminate.

For the low rate, there was used 8.6 lineal feet of 15 inches wide laminate of Example 1 twisted into a loose spiral. That spiral was placed around the sides of the planting hole to circle it about twice. The hole was filled with soil to about six inches and watered to soak to that depth, then six more inches of soil was added and watered and the sequence continued until the hole was filled. The soil was not packed but allowed to compact under its own weight.

The high rate followed the same procedure but using 11.3 lineal feet of 15 inches wide laminate.

The controls were planted by the identical procedure but using no laminate.

The soil was placid sand having 6.3–20 inches per hour permeability and 0.1 to 0.15 inch per inch of soil of water-holding capacity.

The trees were irrigated with 5 to 10 gallons water per tree at the first sign of wilt.

After eight months, the trunk diameter four inches above the union was measured. The mean average diameter for the light rate trees was 3.8 inches; for the high rate the mean diameter was 4.06 inches; and the controls had a mean average diameter of 3.61 inches.

Other hydrophilic polymers may also be employed, such as acrylic copolymer and starch/graft copolymers. Composites containing such polymers with wicking substrates are available commercially as Permasorb Sheet Laminate and Sanwet 1M-300. Also useful are the water-insoluble alkali salts of saponified, gelatinized starch/polyacrylonitrile graft polymers taught in U.S. Pat. Nos. 3,997,484 and 4,405,387. Other such polymers will be known.

What is claimed is:

1. A method for increasing the water capacity and air capacity of soil matrixes comprising the positioning of a mass of a hydrophilic absorbent laminate within said soil matrix.

2. A method of claim 1 wherein said laminate is twisted or crumpled prior to placing in position in the soil.

3. A method of claim 1 wherein the laminate comprises a layer of a wicking substrate applied to one or more surfaces of a layer of a hydrophilic absorbent polymer film.

4. A method of claim 3 wherein said hydrophilic absorbent film comprises a lightly cross-linked alkali metal carboxylic polyelectrolyte having a density ranging from about 1.1 grams per cubic centimeter to about 0.3 gram per cubic centimeter.

5. The method of claim 4 wherein said polyelectrolyte is cross-linked with a polyfunctional cross-linking agent that is reactive with carboxylate groups.

6. The method of claim 5 wherein said polyelectrolyte is cross-linked with a difunctional cross-linking agent that is reactive with carboxylate groups.

7. The method of claim 5 wherein said polyfunctional cross-linking agent is a polyamidepolyamine epichlorohydrin adduct.

8. The method of claim 5 wherein said difunctional cross-linking agent is a diglycidyl ether of a polyglycol said ether having an epoxy equivalent weight of about 175 to 176.

9. The method of claim 4 wherein said polyelectrolyte consists of an alkali metal salt of a polyacrylate.

10. The method of claim 4 wherein said polyelectrolyte consists of a terpolymer of ethyl acrylate, sodium acrylate and sodium methacrylate with 50 mole percent being ethyl acrylate.

11. The method of claim 10 wherein the polyelectrolyte is prepared from a 25 percent aqueous solution of acrylic terpolymer consisting of 52 mole percent ethyl acrylate, 28 mole percent sodium methacrylate and 28 mole percent sodium acrylate and having a pH range of from about 6 to about 8.

12. A method of claim 1 wherein said laminate is chopped into small pieces prior to placing in position in the soil.

13. A method of claim 12 wherein said pieces are up to ¼ inch.

14. A method of claim 1 wherein said laminate is shredded into strands.

15. A method of claim 14 wherein said strands are ⅛ to ½ inch wide.

* * * * *